United States Patent [19]
Takemori

[11] Patent Number: 6,038,042
[45] Date of Patent: Mar. 14, 2000

[54] APPARATUS AND METHOD FOR PRODUCING HOLOGRAM AND APPARATUS AND METHOD FOR DISPLAYING HOLOGRAM

[75] Inventor: Tamiki Takemori, Hamamatsu, Japan

[73] Assignee: Hamamatsu Photonics K.K., Hamamatsu, Japan

[21] Appl. No.: 08/829,901

[22] Filed: Mar. 25, 1997

[30] Foreign Application Priority Data

Mar. 25, 1996 [JP] Japan ................................. 8-068738

[51] Int. Cl.[7] ............................................. G03H 1/08
[52] U.S. Cl. ................................................ 359/9; 359/33
[58] Field of Search ................................. 359/9, 32, 33

[56] References Cited

U.S. PATENT DOCUMENTS

| | | |
|---|---|---|
| 3,518,367 | 6/1970 | Smith . |
| 3,957,353 | 5/1976 | Fienup et al. .............................. 359/9 |
| 4,498,740 | 2/1985 | Caulfield . |
| 5,119,214 | 6/1992 | Nishii et al. ............................... 359/9 |
| 5,347,375 | 9/1994 | Saito et al. . |

FOREIGN PATENT DOCUMENTS

| | | | |
|---|---|---|---|
| 359094091A | 5/1984 | Japan ........................................ 359/1 |

OTHER PUBLICATIONS

Sato et al, "Basic Experiment of Holographic Television by Liquid Crystal Display Device", The Journal of the Institute of Television Engineers of Japan, vol. 45, No. 7, pp. 873–875 (1991).

Hashimoto et al. "High–Resolution Liquid Crystal Spatial Light Modulator and Its Application to Moving Holography", The Journal of the Institute of Image Electronics Enginners of Japan, vol. 22, No. 4, pp. 315–322 (1991).

Fukuya et al, "A Method of the Image Size Magnification for Holographic Display Using Liquid Crystal Device", Three–Dimensional Image Conference '94 Lecture Papers, pp. 165–170 (1994).

Bryngdahl et al, "Single–Sideband Holography", Journal of the Optical Society of America, vol. 58, No. 5, pp. 620–624, (1968).

D. Leseberg, "Computer–generated three–dimensional image holograms," Applied Optics, vol. 31, No. 2, Jan. 10, 1992, pp. 223–229.

Primary Examiner—Jon Henry
Attorney, Agent, or Firm—Pillsbury Madison & Sutro LLP

[57] ABSTRACT

Used as a propagation function is a half-plane propagation function which is restricted such that it has a value only within a half plane in a predetermined direction perpendicular to a propagating axis in a plane which is perpendicular to the propagating axis. According to a convolution integration with this function, the wavefront of object light on a hologram surface is determined, whereby hologram data is produced. Thus produced hologram is read out by means of readout light. After the light with a wavefront forming the conjugate image of the object to be viewed is blocked, the image of the object to be viewed is observed. Thus, a hologram, which has a high quality and from which the conjugate image is easily eliminated at the time of image reproduction, is produced while a recording device with a relatively low spatial resolution is used, and a three-dimensional form is displayed while the distortion with respect to the original image is reduced in thus produced hologram and the conjugate image is eliminated therefrom.

20 Claims, 8 Drawing Sheets

PROPAGATION FUNCTION

REFERENCE LIGHT

APPARATUS AND METHOD FOR PRODUCING HOLOGRAM AND APPARATUS AND METHOD FOR DISPLAYING HOLOGRAM

BACKGROUND OF THE INVENTION

1. Field of the Invention

The present invention relates to a hologram producing apparatus for producing three-dimensional information of an object and a hologram displaying apparatus for reading out the three-dimensional information of the object from the hologram producing apparatus so as to display a three-dimensional image of the object.

2. Related Background Art

Holography has been noted as a technique for displaying a three-dimensional image of an object. It includes a hologram producing technique for producing three-dimensional information of an object and a hologram displaying technique for reading out the three-dimensional image recorded by the hologram producing technique so as to display a three-dimensional image of the object.

Conventional holography has been constructed on the premise that its recording device has a high resolution. Accordingly, most of hologram producing apparatuses use high-resolution photographic dry plates or thermoplastics as their recording devices. These devices utilize their characteristically high resolution so as to set a relatively large angle between reference light and object light, thereby producing a hologram based on actual imaging or by recording results of calculations performed by a computer or the like. Holograms thus obtained can be reproduced by the so-called off-axis method, whereby the image quality can be prevented from deteriorating due to conjugate images.

Such a hologram producing technique is basically a high-grade photographic technique due to its high resolution, thereby necessitating an enormous amount of labor for capturing a hologram. Also, since it requires the photographic dry plate or thermoplastic to be developed, operations may not sufficiently be performed in real time.

Thus, techniques of holography using a CCD camera, which is a low resolution relatively low-resolution imaging device, have been proposed in Sato et al., *the Journal of the Institute of Television Engineers of Japan*, Vol. 45, No. 7, pp. 873–875 (1991), referred to as "conventional example 1" hereinafter, and Hashimoto, *the Journal of the Institute of Image Electronics Engineers of Japan*, Vol. 22, No. 4, pp. 315–322 (1991), referred to as "conventional example 2" hereinafter, for example.

The conventional example 1 exemplifies a technique of Fresnel type holography in which a lens normally employed in the holographic imaging technique is not used. Also, the holographic imaging technique disclosed in the conventional example 2 uses an imaging lens so as to match the spatial resolution of a real image with that of the imaging device, while disposing an opening directly in front of the imaging lens on the object side, so as to obtain an off-axis type hologram.

Further, a technique of holography in which a computer hologram is reproduced by a low-resolution liquid-crystal spatial light modulator has been proposed in Maeno et al., *Three-Dimensional Image Conference '94 Lecture Papers*, pp. 165–170, referred to as "conventional example 3" hereinafter. In the conventional example 3, a mask is disposed around a real image to be reproduced, thereby eliminating light from its conjugate image.

Also, as a method for eliminating the conjugate image at the time when a reproduced image is observed, single side band method (O. Bryngdahl et al., *J. Opt. Soc. Am.*, 58, 620, 1968) has been known.

In this method, first, with respect to a two-dimensional planar object whose phase component does not change, a conjugate image is obtained by a confocal optical system, and then a Fresnel hologram of this conjugate image is obtained. In order to obtain this Fresnel hologram, a mask which can transmit therethrough only one side of Fourier components of object light is disposed on a Fourier plane of the confocal optical system, and then the Fresnel hologram of the image constituted by thus transmitted Fourier components of the object light is recorded.

Thereafter, while a confocal optical system in which the wavefront subjected to Fresnel propagation from the hologram by the distance equal to that at the time of recording becomes the object-side focal plane is used, the Fourier components on the side which were not masked at the time of recording are masked, and an image is formed by thus transmitted light, whereby a reproduced image is obtained free of the conjugate image.

SUMMARY OF THE INVENTION

It is an object of the present invention to allow a three-dimensional form to be displayed with a reduced distortion while the conjugate image is eliminated, even when a recording device with a relatively low spatial resolution is used as a medium for forming a hologram.

The hologram producing apparatus of the present invention is a hologram producing apparatus for producing a hologram on a planar hologram surface concerning a virtual object in a virtual three-dimensional space and comprises: (a) a wavefront determining section for determining, based on a position set for a virtual image to be observed and a first imaging optical system having a positive refractive power, the wavefront of light carrying information concerning the virtual object, the first imaging optical system being a virtual optical system forming the virtual image; (b) a region defining section for computing, based on a propagation function of the wavefront determined by the wavefront determining section, a half-plane propagation function which has a value only within a half plane in a predetermined direction perpendicular to a propagating axis in a plane which is perpendicular to the propagating axis; and (c) a convolution integrating section for performing a convolution integration of the half-plane propagation function on the hologram surface and the wavefront determined by the wavefront determining section so as to compute the wavefront of object light on the hologram surface.

Such a hologram producing apparatus can suitably be realized by means of a computer system.

Here, the wavefront determining section may comprise (i) a position computing section for computing, based on the position of the virtual image and the first imaging optical system, a position of a real image corresponding to the virtual image; and (ii) a wavefront computing section for computing a wavefront of the object light at each point of the real image. Also, it may comprise (i) a position computing section for computing, based on the position of the virtual image and the first imaging optical system, a position on the hologram surface corresponding to each point of the virtual image; and (ii) a wavefront computing section for computing a wavefront of light at each point of the virtual image.

The hologram producing apparatus may further comprise interference calculating means for computing a complex sum of the wavefront of object light and wavefront of reference light on the hologram surface and taking out a real number portion thereof so as to obtain hologram data.

The hologram producing apparatus of the present invention performs the hologram producing method of the present invention as will be explained in the following.

In the hologram producing method of the present invention, first, based on a position set for a virtual image to be observed and the first imaging optical system having a positive refractive power, the wavefront determining section determines the wavefront of light carrying information concerning the virtual object (first step).

In the case where the wavefront determining section comprises (i) a first position computing section for computing, based on the position of the virtual image and the first imaging optical system, a position of a real image corresponding to the virtual image, and (ii) a first wavefront computing section for computing a wavefront of the object light at each point of the real image; first, the position of the virtual image to be observed is determined and then, from thus determined virtual image position, the position computing section computes the position of the real image corresponding to the virtual image. In order to compute the position of the real image, the Gaussian imaging rule concerning the first imaging optical system is used with the given virtual image position. Subsequently, the wavefront computing section computes the wavefront of the object light of the real image at the real image position computed by the position computing section.

In the case where the wavefront determining section comprises (i) a second position computing section for computing, based on the position of the virtual image and the first imaging optical system, a position on the hologram surface corresponding to each point of the virtual image; and (ii) a second wavefront computing section for computing a wavefront of light at each point of the virtual image; first, the position of the virtual image to be observed is determined and then, from thus determined virtual image position, the position computing section computes the position on the hologram surface corresponding to each point of the virtual image. This position on the hologram surface position is computed from the virtual image position and hologram surface position which are based on the position of the first imaging optical system. Subsequently, the wavefront computing section computes the wavefront of light in each point of the virtual image.

On the other hand, based on a propagation function expressing the propagation of object light, the region defining section computes a half-plane propagation function which is set to have a value only within a half plane in a predetermined direction perpendicular to a propagating axis in a plane which is perpendicular to the propagating axis (second step). Namely, the region defining section keeps the propagation function as it is within the half plane in the predetermined direction perpendicular to the propagating axis in the plane which is perpendicular to the propagating axis, while setting it to zero within a half-plane in the direction opposite to the predetermined direction perpendicular to the propagating axis in the plane which is perpendicular to the propagating axis.

Then, the convolution integrating section performs a convolution integration of the wavefront of object light at the real image position and the half-plane propagation function on the hologram surface so as to compute the wavefront of object light on the hologram surface (third step).

Thereafter, the complex sum of the wavefront of object light and wavefront of reference light on the hologram surface is computed so as to calculate the interference with the reference light, and then a real number portion is taken out therefrom, whereby hologram data is obtained. In the case where the apparatus is of in-line type in which the reference light is vertically incident on the hologram surface with a uniform intensity, the real number component of the complex sum is in proportion to the wavefront of object light on the hologram surface, whereby it becomes unnecessary for the complex sum to be computed.

In the case where the apparatus is not of in-line type, the interference calculating section is further provided for computing the complex sum of the wavefront of object light and the wavefront of reference light on the hologram surface so as to calculate the interference with the reference light, and the real number portion of the computed complex sum is taken out so as to obtain hologram data.

The hologram displaying apparatus of the present invention is a hologram displaying apparatus for displaying an image of a virtual object based on the hologram produced by the hologram producing apparatus of the present invention and comprises: (a) information storing section for storing the hologram data produced in by the hologram producing apparatus of the present invention; (b) a hologram forming section for forming a hologram based on the hologram data stored in the information storing section; (c) a second imaging optical system which receives light with a wavefront forming the hologram so as to form a virtual image of the virtual object and has a positive refractive power equivalent to the refractive power of the first imaging optical system; (d) a first light-shielding section which is disposed at a focal point of the second imaging optical system opposite to the hologram and blocks zero-order light; and (e) a second light-shielding section which is disposed on a focal plane of the second imaging optical system opposite to the hologram and blocks a principal ray of light with a wavefront forming a real image, of light traveled by way of the second imaging optical system with a wavefront forming the hologram.

Here, the hologram displaying apparatus of the present invention may further comprise moving means for changing the distance between the position of the hologram and the focal plane of the second imaging optical system on the hologram side.

Also, the hologram forming section may comprise (i) a display section for displaying an optical image of a result of imaging notified from the information storing section; (ii) a spatial light modulator into which a spatial light modulated image corresponding to the optical image displayed by the display section is written; and (iii) a hologram forming optical system which receives modulated light formed as readout light travels by way of the spatial light modulator, and forms a hologram having a size identical to the imaging device of the hologram producing apparatus. Here, the hologram forming section may further comprise a light source for generating readout light to illuminate the spatial light modulator.

The hologram displaying apparatus of the present invention performs the hologram displaying method of the present invention as will be explained in the following.

In the hologram displaying apparatus of the present invention, first, the hologram data produced by the hologram producing apparatus of the present invention is stored in the information storing section (first step) and then, by utilizing the readout light or the like, the hologram forming section forms the hologram produced by the hologram producing apparatus (second step). The light which has traveled by way of the hologram formed by the hologram forming section includes a light component with a wavefront forming a real image which becomes a virtual image suitable for viewing after traveling through the subsequent second imaging optical system and a light component with a wavefront forming a virtual image which is a conjugate image of this real image. While the light component with a wavefront forming a virtual image, which is a conjugate image, forms a real image after traveling through the second imaging optical system (third step), it becomes an obstacle to viewing.

Namely, the light which has traveled by way of the hologram formed by the hologram forming section includes a light component with a wavefront forming a virtual image suitable for viewing, a light component with a wavefront forming a real image that is unnecessary for viewing, and a zero-order light component which is also unnecessary for viewing.

Here, since the second imaging optical system is an optical system equivalent to the first imaging optical system used at the time of image recording, the real image and virtual image formed through the second imaging optical system are free of distortion.

In the hologram displaying apparatus of the present invention, the zero-order light component that is unnecessary for viewing is masked by the first light-shielding means which is disposed at the focal point of the second imaging optical system opposite to the hologram (fourth step), whereas the light component with a wavefront forming the real image that is unnecessary for viewing is masked by the second light-shielding means disposed on the focal plane of the second imaging optical system opposite to the hologram (fifth step).

As a result, only the light with a wavefront forming a virtual image suitable for viewing reaches beyond the focal plane of the second imaging optical system opposite to the hologram. Accordingly, when only the light with a wavefront forming a virtual image suitable for viewing is fed from a position beyond the focal plane of the second imaging optical system opposite to the hologram, a reproduced image with a high quality can be viewed.

Here, functions of the hologram forming section, second imaging optical system, first light-shielding means, and second light-shielding means may also be realized by arithmetic processing operations by means of a computer.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the hologram producing apparatus and hologram displaying apparatus in accordance with the present invention will be explained with reference to attached drawings. In the explanation of the drawings, constituents identical to each other will be referred to with marks identical to each other without their overlapping descriptions repeated.

EMBODIMENTS OF HOLOGRAM PRODUCING APPARATUS (First Embodiment)

Figure 1:
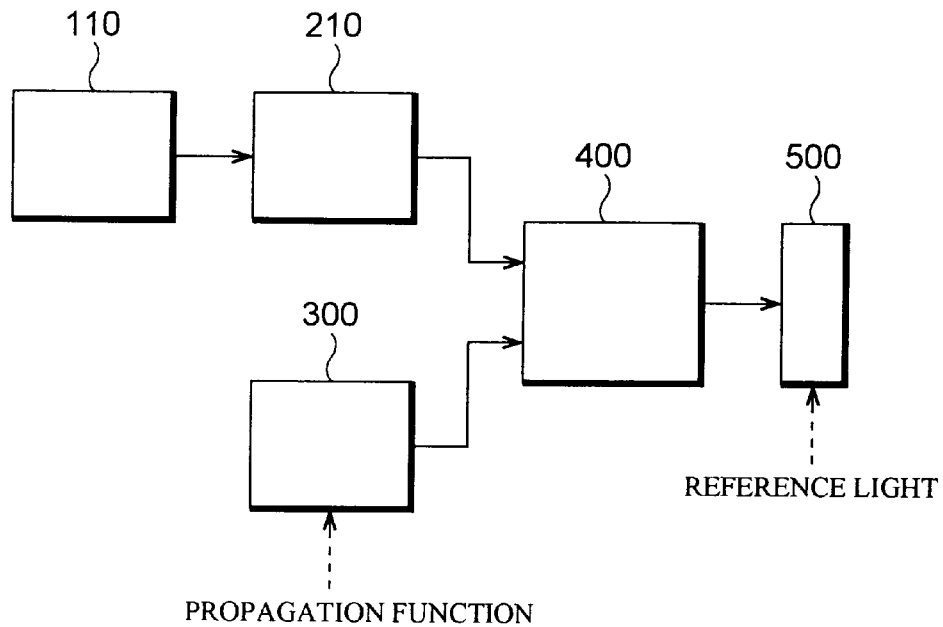
FIG. 1 is a configurational view showing a first embodiment of the hologram producing apparatus in accordance with the present invention.

FIG. 1 is a configurational view showing a first embodiment of the hologram producing apparatus in accordance with the present invention. As depicted, this apparatus comprises (a) a position computing section 110 for computing, based on a predetermined position of a virtual image to be observed and a virtual imaging optical system having a positive refractive power, the position of a real image corresponding to the virtual image; (b) a wavefront computing section 210 for computing the wavefront of object light at the real image position; (c) a region defining section 300 for defining a propagation function for propagation of the object light such that it has a value only within a half plane in a predetermined direction perpendicular to a propagating axis in a plane which is perpendicular to the propagating axis, thereby computing a half-plane propagation function; (d) a convolution integrating section 400 for performing a convolution integration of the wavefront of object light at the real image position and the half-plane propagation function on a hologram surface so as to compute the wavefront of object light on the hologram surface; and (e) an interference calculating section 500 for computing the complex sum of the wavefront of object light and wavefront of reference light on the hologram surface and taking out a real number portion thereof so as to obtain hologram data. Such a hologram producing apparatus is suitably realized by means of a computer system which is adapted to perform functional operations.

Figure 2:
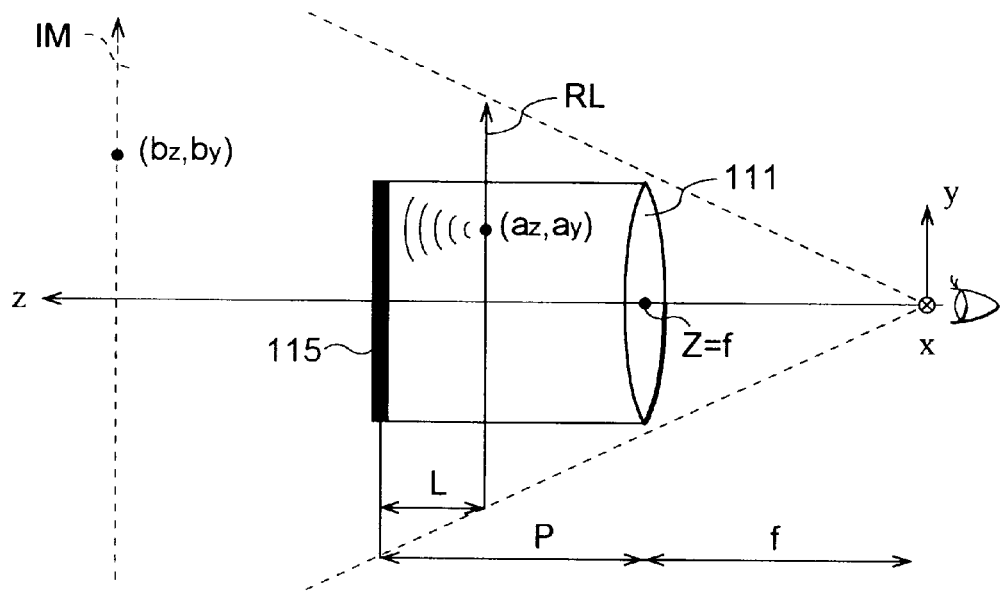
FIG. 2 is an explanatory view of an optical system assumed to be established in the hologram producing apparatus in accordance with the first embodiment.

FIG. 2 is an explanatory view of an optical system assumed to be established in the apparatus of this embodiment for producing the hologram. As shown in FIG. 2, in the apparatus of this embodiment, at the time when an image is viewed, it is assumed that a virtual image IM is viewed by way of an imaging optical system 111 (focal length=f). Here, in FIG. 2, as depicted, it is assumed that the optical-axis direction of the imaging optical system 111 is the Z direction, the upward direction in the paper surface is the Y direction, and the direction perpendicular to the paper surface is the X direction. Also, the perspective position is adopted as the origin. Further, a hologram surface 115 is disposed at a focal plane position of the imaging optical system 111 opposite to the viewpoint assumed to be used at the time of viewing.

Figure 3:
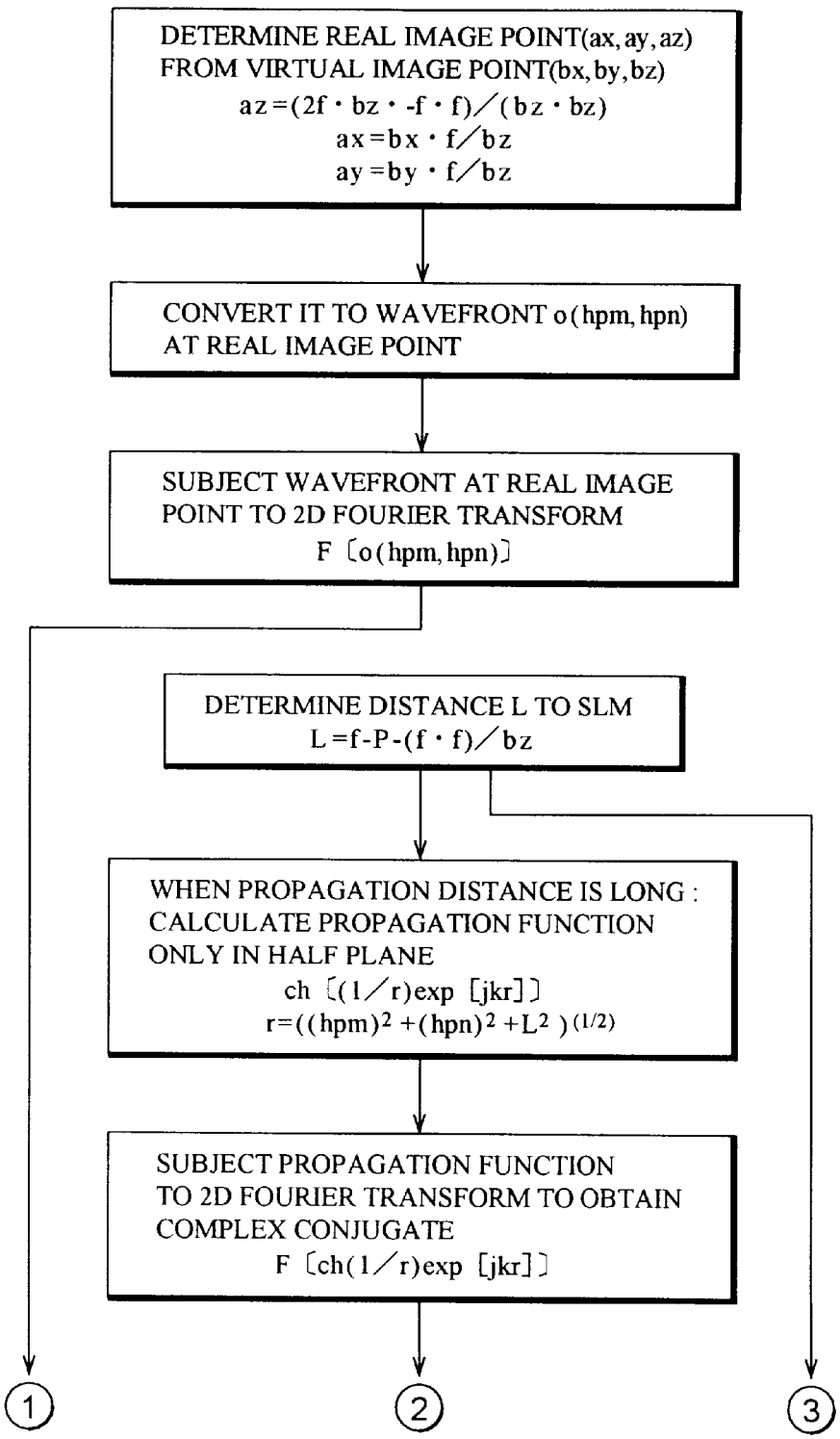
FIG. 3 is a flow chart showing (the first half of) operations of the hologram producing apparatus in accordance with the first embodiment.
Figure 4:
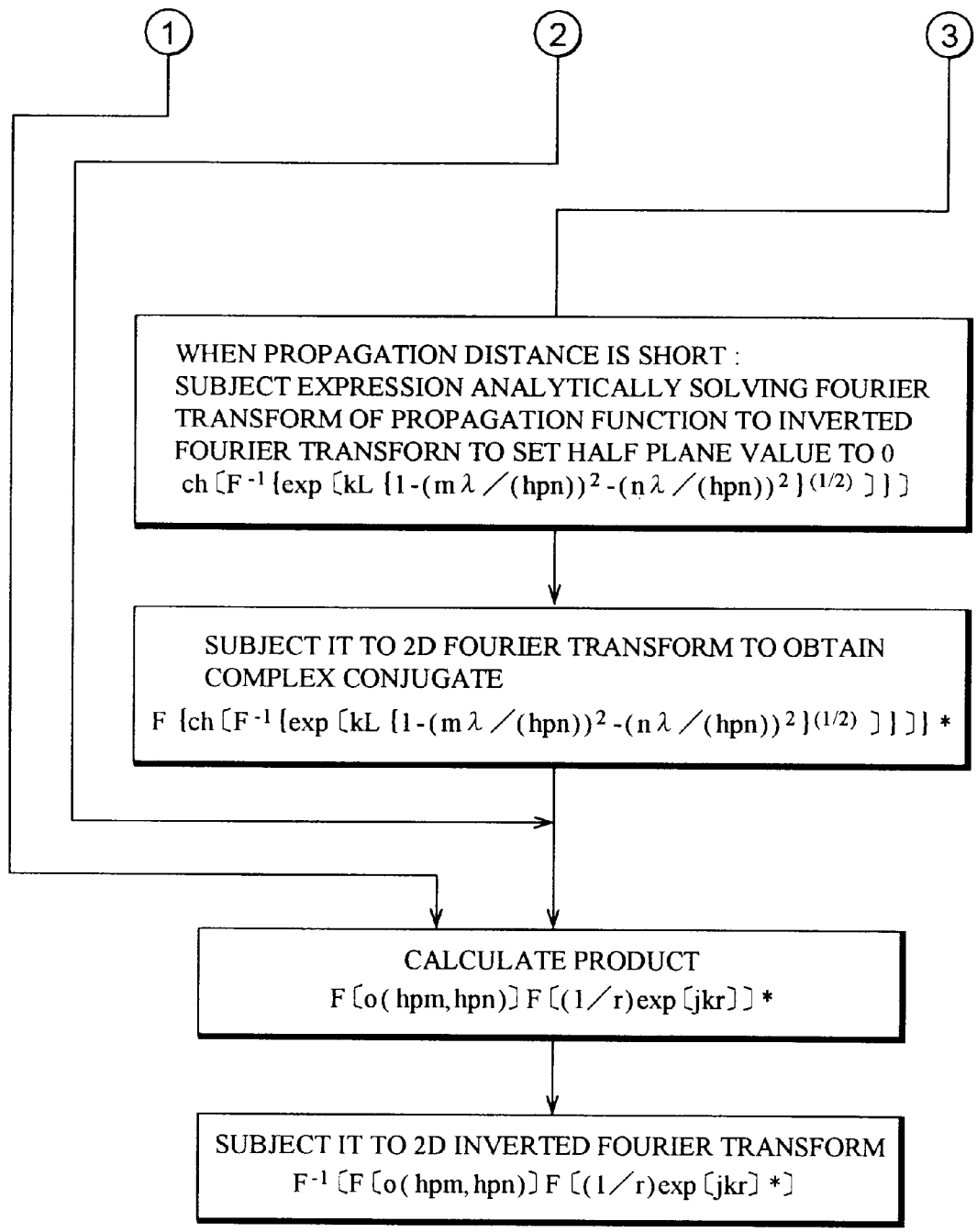
FIG. 4 is a flow chart showing (the latter half of) operations of the hologram producing apparatus in accordance with the first embodiment.

The hologram producing apparatus in accordance with this embodiment obtains hologram data as will be explained in the following manner. FIGS. 3 and 4 are flow charts for explaining operations of this apparatus.

In the hologram producing apparatus in accordance with this embodiment, first, the position (Z=bz) of the virtual image to be observed is determined. Then, the position computing section 110 uses the Gaussian imaging rule to compute, from the position (bx, by, bz) of each point of the virtual image IM, the position (ax, ay, az) of each point of a real image RL according to the following expressions (1) to (3):

$$ax = bx \cdot f/bz \quad (1)$$

$$ay = by \cdot f/bz \quad (2)$$

$$az = (2 \cdot f \cdot bz - f \cdot f)/(bz \cdot bz) \quad (3)$$

Here, distance p between the hologram surface and the imaging optical system 111 and distance L between the hologram surface and the real image RL becomes:

$$L = f - P - (f \cdot f)/bz \quad (4)$$

Subsequently, the wavefront computing section 210 computes the wavefront O(X, Y) of object light of the real image at the real image position (ax, ay, az) computed by the position computing section 110.

On the other hand, the region defining section 300 computes a half-plane propagation function in which the propagation function f(X, Y) on the hologram surface 115 is defined such that it has a value only within a half plane in a predetermined direction perpendicular to a propagating axis in a plane which is perpendicular to the propagating axis. Namely, the region defining section 300 keeps the propagation function on the hologram surface 115 as it is within the half plane in the predetermined direction perpendicular to the propagating axis in the plane which is perpendicular to the propagating axis, while setting it to zero, i.e., f(X, Y)=0, within a half plane in the direction opposite to the predetermined direction perpendicular to the propagating axis in the plane which is perpendicular to the propagating axis.

Here, the propagation function f(X, Y) on the hologram surface 115 is given by:

$$f(X, Y) = (1/r) \exp[j \cdot k \cdot r] \quad (5)$$

wherein $r = (X^2 + Y^2 + Z^2)^{1/2}$ and k is wave number.

Then, the convolution integrating section 400 computes a wavefront u(X, Y) of object light on the hologram surface 115 as an inverted Fresnel transform of the wavefront O(X, Y) of object light at the real image position by performing a convolution integration of the wavefront O(X, Y) of object light at the real image position and the half-plane propagation function f(Xf Y) on the hologram surface 115 according to the following expression (6):

$$u(X, Y) = F^{-1}\{F[O(X, Y)] \cdot F[f(X, Y)]^*\} \quad (6)$$

Here, the Fresnel transform approximating the distance is not applicable to cases where the distance is short or where a precision of a few thousandths of wavelength is required.

In the actual calculation, since a discrete operation is performed, it is always necessary for Nyquist intervals to be closely investigated. Accordingly, without mechanical Fourier transform of the propagation function f(X, Y), F[f(X, Y)] may be used as being analytically solved and approximated by:

$$F[f(X, Y)] = \exp[j \cdot k \cdot L(1 - \mu^2 \lambda^2)^{1/2}] \quad (7)$$

wherein $\mu$ is spatial frequency and $\lambda$ is wavelength. When the thus approximated value is to be used, it is assumed to have a value in the half plane as mentioned above.

Explained in the following is a case where the foregoing is expressed discretely.

Assuming that the Fresnel transmission distance is L, the hologram pitch is $h_p$, the wavefront of real image position is $O(h_p m, h_p n)$, and the wavefront on the hologram surface 115 is $H(h_p m, h_p n)$, the following expressions are obtained:

$$H(h_p m, h_p n) = F^{-1}\{F[O(h_p m, h_p n)] \times F[f(h_p m, h_p n)]^*\} \quad (8)$$

$$f(h_p m, h_p n) = (1/r) \exp[j \cdot k \cdot r] r = [(h_p m)^2 + (h_p n)^2 + L^2]^{1/2} \quad (9)$$

wherein m is an integer from $-N/2$ to $(N/2)-1$ and n is an integer from $-N/2$ to $(N/2)-1$.

Here, $f(h_p m, h_p n)$ has a value only in a half plane and becomes zero in the other region. Assuming that the half plane is a region where X is positive, $f(h_p m, h_p n)$ has a value when m is an integer of 0 to $(N/2)-1$ and n is an integer of $-N/2$ to $(N/2)-1$. Assuming that the half plane is a region where X is negative, $f(h_p m, h_p n)$ has a value when m is an integer of $-N/2$ to 0 and n is an integer of $-N/2$ to $(N/2)-1$. Assuming that the half plane is a region where Y is positive, $f(h_p m, h_p n)$ has a value when m is an integer of $-N/2$ to $(N/2)-1$ and n is an integer of 0 to $(N/2)-1$. Assuming that the half plane is a region where Y is negative, $f(h_p m, h_p n)$ has a value when m is an integer of $-N/2$ to $(N/2)-1$ and n is an integer of $-N/2$ to 0.

The foregoing transform for attaining a value only in the half plane will be expressed hereinafter as:

$$ch[f(h_p m, h_p n)]$$

Depending on the value of Fresnel length L, the following expression (10):

$$F[f(h_p m, h_p n)]$$
$$= \exp(kL\{1 - [m\lambda/(h_p N)]^2 - [n\lambda/(h_p N)]^2\}^{1/2}) \quad (10)$$

may preferably be used.

In order to utilize this expression, after inverting the Fourier transform, the half plane is set to zero. This operation can be expressed as:

$$ch\{F^{-1}[\exp(kL\{1 - [m\lambda/(h_p N)]^2 - [n\lambda/(h_p N)]^2\}^{1/2})]\} \quad (11)$$

Then, the interference calculating section 500 computes the complex sum of the wavefront of object light $H(h_p m, h_p n)$ and wavefront of reference light on the hologram surface and taking out a real number portion thereof so as to obtain hologram data.

Here, in the case of an in-line type apparatus, the calculation of interference by the interference calculating means is unnecessary, and the real number component of $H(h_p m, h_p n)$ may be taken out as the wavefront on the hologram surface 115.

(Second Embodiment)

Figure 5:
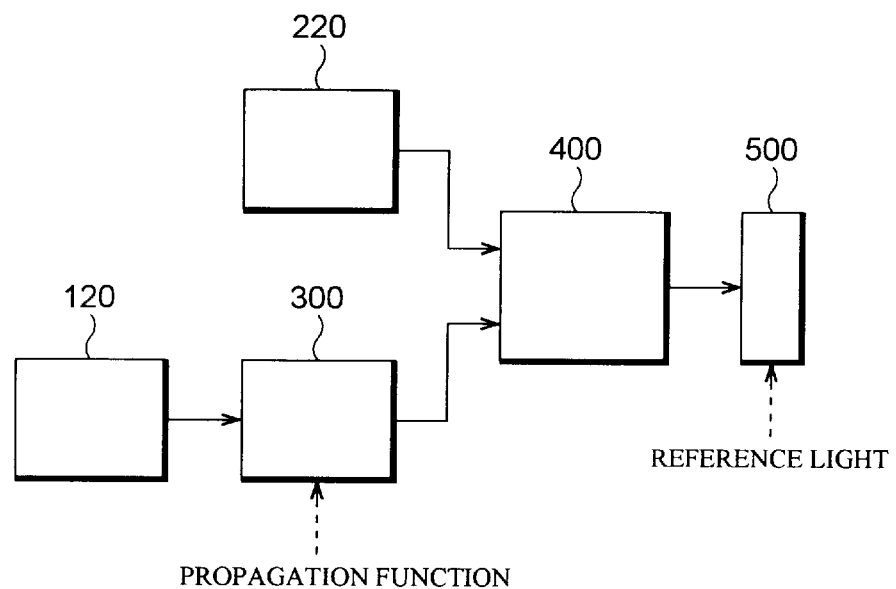
FIG. 5 is a configurational view showing a second embodiment of the hologram producing apparatus in accordance with the present invention.

FIG. 5 is a configurational view showing a second embodiment of the hologram producing apparatus in accordance with the present invention. As depicted, this apparatus comprises (a) a position computing section 120 for computing, based on a predetermined position of a virtual image to be observed and a virtual imaging optical system having a positive refractive power, the position of a real image on a hologram surface corresponding to each point of the virtual image; (b) a wavefront computing section 220 for computing the wavefront of object light on the hologram surface; (c) the region defining section 300 for defining a propagation function for propagation of the object light such that it has a value only within a half plane in a predetermined direction perpendicular to a propagating axis in a plane which is perpendicular to the propagating axis, thereby computing a half-plane propagation function; (d) the convolution integrating section 400 for performing a convolution integration of the wavefront of object light at the real image position and the half-plane propagation function on the hologram surface so as to compute the wavefront of object light on the hologram surface; and (e) the interference calculating section 500 for computing the complex sum of the wavefront of object light and wavefront of reference light on the hologram surface and taking out a real number portion thereof so as to obtain hologram data. Such a hologram producing apparatus is suitably realized by means of a computer system which is adapted to perform functional operations.

Figure 6:
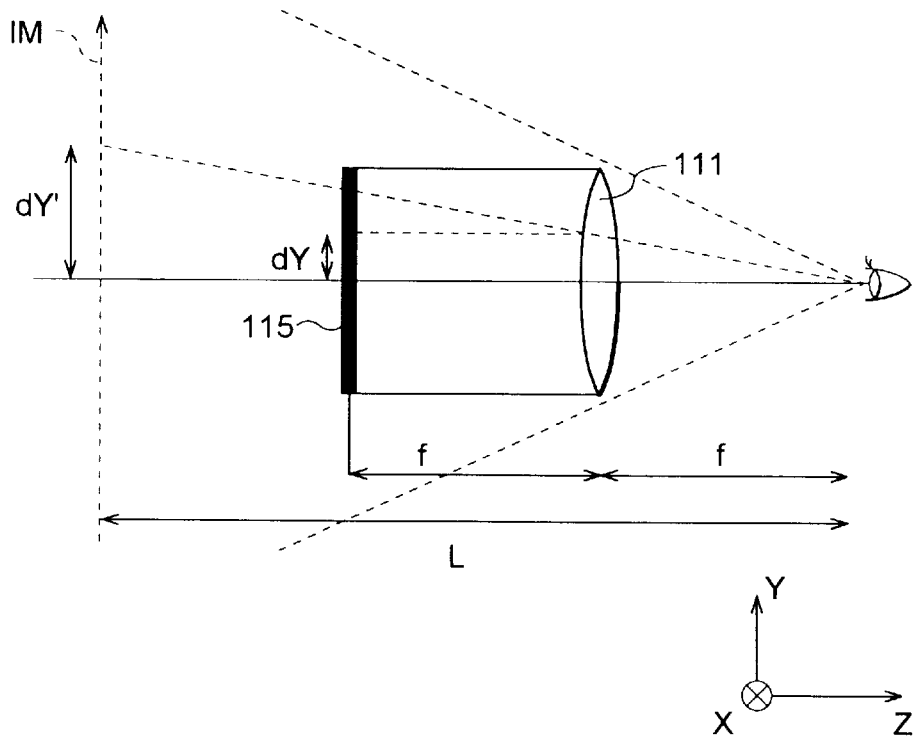
FIG. 6 is an explanatory view of an optical system assumed to be established in the hologram producing apparatus in accordance with the second embodiment.

FIG. 6 is an explanatory view of an optical system assumed to be established in the apparatus of this embodiment for producing the hologram. As shown in FIG. 6, in the apparatus of this embodiment, at the time when an image is viewed, it is assumed that the virtual image IM is viewed by way of the imaging optical system 111 (focal length=f), while one focal plane of the imaging optical system 111 is used as a viewing surface. Here, in FIG. 6, as depicted, it is assumed that the optical-axis direction of the imaging optical system is the Z direction, the upward direction in the paper surface is the Y direction, and the direction perpendicular to the paper surface is the X direction. Also, the hologram surface 115 is disposed at a focal plane position of the imaging optical system 111 opposite to the viewpoint assumed to be used at the time of viewing.

Figure 7:
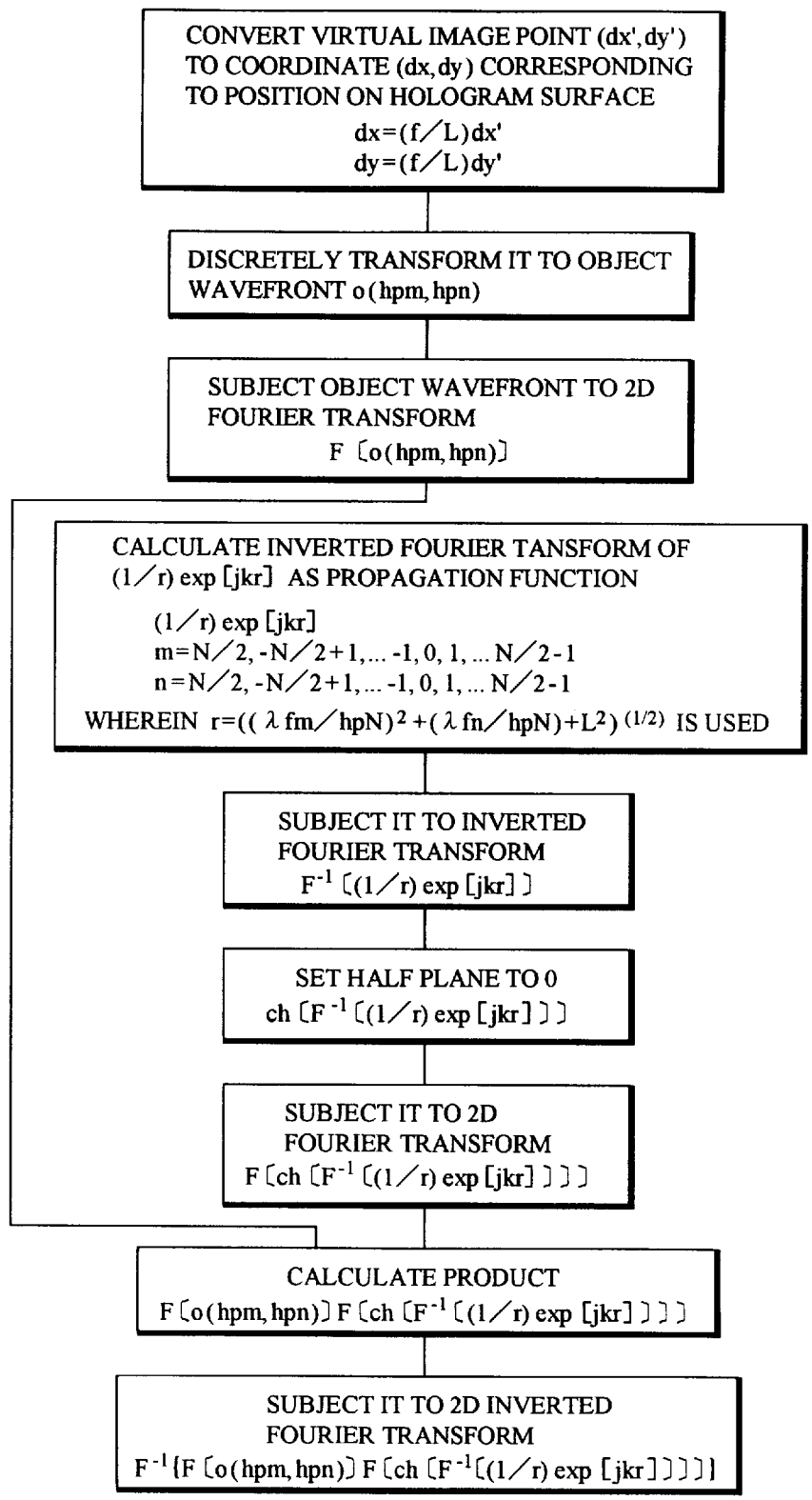
FIG. 7 is a flow chart showing operations of the hologram producing apparatus in accordance with the second embodiment.

The hologram producing apparatus in accordance with this embodiment obtains hologram data as will be explained in the following manner. FIG. 7 is a flow chart for explaining operations of this apparatus.

It is assumed in FIG. 6 that the imaging optical system 111 is not provided, while a point light source $\delta(X)$ is disposed on the optical axis as being separated from the viewing surface by distance L. In this case, the wavefront $f(X, Y)$ of object light on the viewing surface is expressed by:

$$f(X, Y) = (1/r)\exp[j \cdot k \cdot r] \quad (12)$$

wherein $r = (X^2 + Y^2 + L^2)^{1/2}$ and k is wave number. Also, assuming that the wavefront immediately downstream of the hologram surface 115 is $u(X, Y)$, the wavefront at the viewing surface when the imaging optical system 111 exists becomes:

$$F[u(X, Y)]$$

wherein F is the Fourier transform.

Here, assuming $$f(X, Y) = F[u(X, Y)] \quad (13)$$

the following expression:

$$u(X, Y) = F^{-1}\{(1/r)\exp[j \cdot k \cdot r]\} \quad (14)$$

is obtained. This wavefront $u(X, Y)$ is an object wave of a hologram which reproduces the point light source on the optical axis on a surface (virtual image surface) separated from the viewing surface by the distance L. Namely, it becomes a propagation function including the imaging optical system 111.

Next considered is the case where the point light source existing at a given position $(X', Y')$ on the virtual image surface is reproduced. In this case, a position $(X, Y)$ on the hologram surface 115 is calculated by the following expressions (15) and (16):

$$X = (f/L)X' \quad (15)$$

$$Y = (f/L)Y' \quad (16)$$

and then a wavefront similar to the above-mentioned $u(X, Y)$ is set at this position.

Namely, first, according to the above expressions (15) and (16), the position computing section 120 computes the position $(X, Y)$ on the hologram surface 115 corresponding to the position $(X', Y')$ on the virtual image surface.

Subsequently, the wavefront computing section 220 computes the wavefront $O(X, Y)$ of each point of the virtual image.

On the other hand, the region defining section 300 computes a half-plane propagation function in which the propagation function $u(X, Y)$ at the position $(X, Y)$ on the hologram surface 115 is defined such that it has a value only within a half plane in a predetermined direction perpendicular to a propagating axis in a plane which is perpendicular to the propagating axis. Namely, the region defining section 300 keeps the propagation function on the hologram surface 115 as it is within the half plane in the predetermined direction perpendicular to the propagating axis in the plane which is perpendicular to the propagating axis, while setting the propagation function to zero within a half plane in the direction opposite to the predetermined direction perpendicular to the propagating axis in the plane which is perpendicular to the propagating axis.

Then, the convolution integrating section 400 determines the wavefront $U(X, Y)$ of object light on the hologram surface 115 by calculating a convolution integration according to the following expression (17):

$$U(X, Y) = F^{-1}(F[O(X, Y)] \times F\{F^{-1}L[f(X, Y)]\}) \quad (17)$$

Explained in the following is a case where the foregoing is expressed discretely.

Assuming that the Fresnel transmission distance is L, the hologram pitch is $h_p$, the wavefront of virtual image position is $O(h_p m, h_p n)$, and the wavefront on the hologram surface 115 is $U(h_p m, h_p n)$, the following expressions are obtained:

$$U(h_p m, h_p n) = F^{-1}[F[O(h_p m, h_p n)] \times F(\text{ch}\{F^{-1}[f(h_p m, h_p n)]\})] \quad (18)$$

$$f(h_p m, h_p n) = (1/r)\exp[j \cdot k \cdot r]$$

$$r = [(h_p m)^2 + (h_p n)^2 + L^2]^{1/2}$$

wherein m is an integer from $-N/2$ to $(N/2)-1$ and n is an integer from $-N/2$ to $(N/2)-1$.

Here, $f(h_p m, h_p n)$ has a value only in a half plane and becomes zero in the other region. Assuming that the half plane is a region where X is positive, $f(h_p m, h_p n)$ has a value when m is an integer of 0 to (N/2)–1 and n is an integer of –N/2 to (N/2)–1. Assuming that the half plane is a region where X is negative, $f(h_p m, h_p n)$ has a value when m is an integer of –N/2 to 0 and n is an integer of –N/2 to (N/2)–1. Assuming that the half plane is a region where Y is positive, $f(h_p m, h_p n)$ has a value when m is an integer of –N/2 to (N/2)–1 and n is an integer of 0 to N/2–1. Assuming that the half plane is a region where Y is negative, $f(h_p m, h_p n)$ has a value when m is an integer of –N/2 to (N/2)–1 and n is an integer of –N/2 to 0.

The foregoing transform for attaining a value only in the half plane is represented as:

$$\text{ch}[f(h_p m, h_p n)]$$

in the above-mentioned expression (18).

Then, the interference calculating section 500 computes the complex sum of the wavefront of object light $H(h_p m, h_p n)$ and wavefront of reference light on the hologram surface and taking out a real number portion thereof so as to obtain hologram data.

Here, in the case of an in-line type apparatus, the calculation of interference by the interference calculating means is unnecessary, and the real number component of $U(h_p m, h_p n)$ may be taken out as the wavefront on the hologram surface 115.

Embodiment of Hologram Displaying Apparatus

Figure 8:
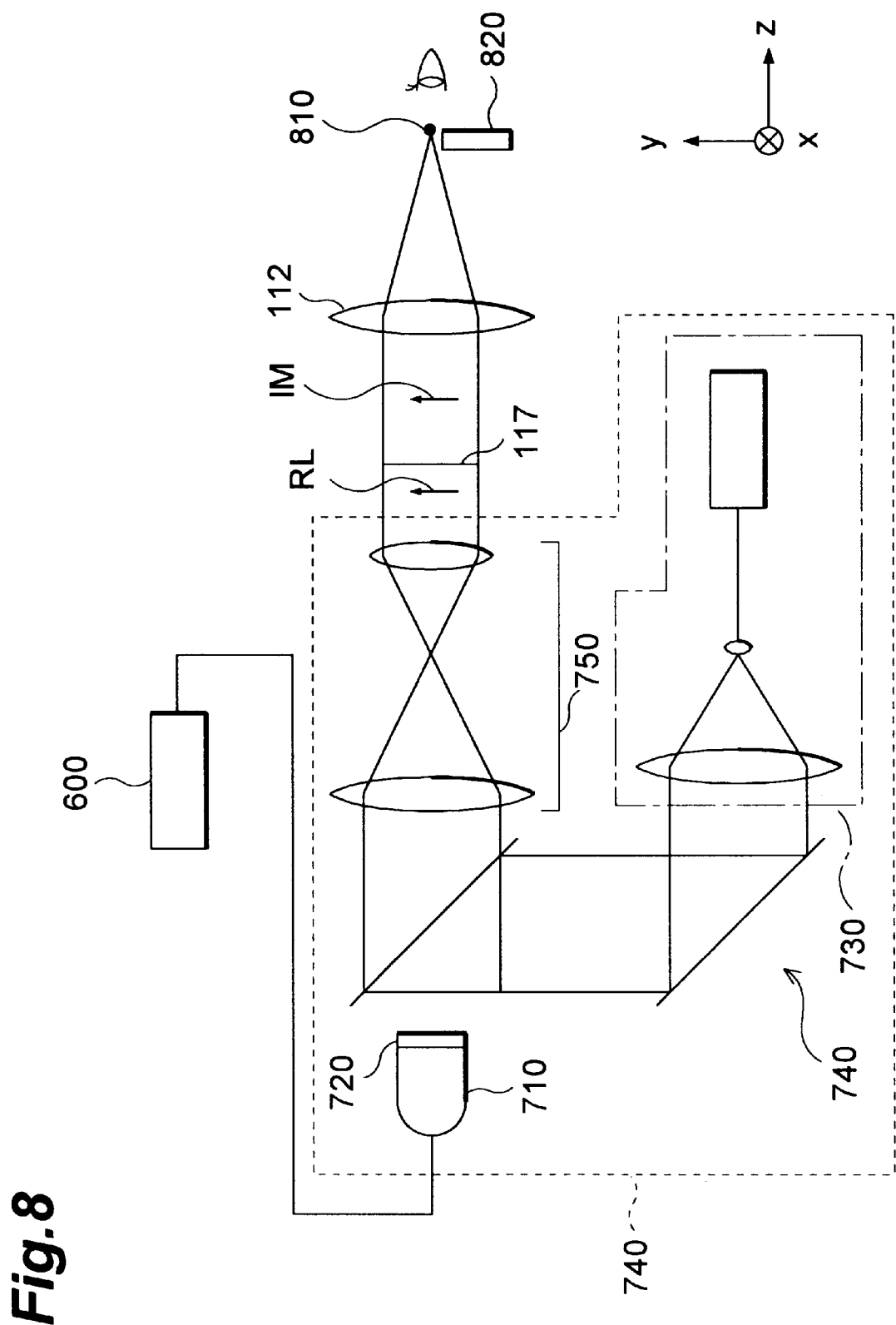
FIG. 8 is a configurational view showing an embodiment of the hologram displaying apparatus in accordance with the present invention.

FIG. 8 is a configurational view showing a hologram displaying apparatus in accordance with the present invention. This hologram displaying apparatus reproduces and displays an image based on an intensity hologram produced by the hologram producing apparatus shown in FIGS. 1 or 5.

As shown in FIG. 8, this apparatus comprises (a) an information input section 600 for receiving hologram information from the hologram producing apparatus; (b) a hologram forming section 700 which receives the hologram information by way of the information input section 600 and forms a hologram 117 based on the hologram information; (c) an imaging optical system 112, equivalent to the imaging optical system 111 shown in FIG. 2, which receives light with a wavefront forming the hologram 117 and forms an image of thus received light; (d) a zero-order light-shielding plate 810 disposed at the focal point position of the imaging optical system 112 opposite to the hologram 117; and (e) a light-shielding plate 820 disposed below the focal plane of the imaging optical system 112 opposite to the hologram 117 in the paper surface.

The hologram forming section 700 comprises (i) a display device 710 for displaying an image based on the information communicated from the information input section 600; (ii) a spatial light modulator 720 into which the image displayed by the display device 710 is written; (iii) a laser light source 730 for generating coherent light which is a plane wave to illuminate the spatial light modulator 720; (iv) a relay optical system 740 for guiding the light emitted from the laser light source 730 to the spatial light modulator 720; and (v) an afocal optical system 750 which receives the light modulated in terms of phase by the spatial light modulator 720 and forms the hologram 117 of the spatial light modulator 720.

First, the image information, which is hologram information, is fed from the information input section 600 so as to be displayed by the display device 710, and this image information is written into the spatial light modulator 720. A small CRT and a light-writing type liquid-crystal light modulator are suitably used for the display device 710 and the spatial light modulator 720, respectively.

Subsequently, the light emitted from the laser light source 730 illuminates the spatial light modulator 720 by way of the relay optical system 740. Then, the light modulated in terms of phase by the spatial light modulator 720 forms the hologram 117 of the spatial light modulator 720 by way of the afocal optical system 750.

Figure 9:
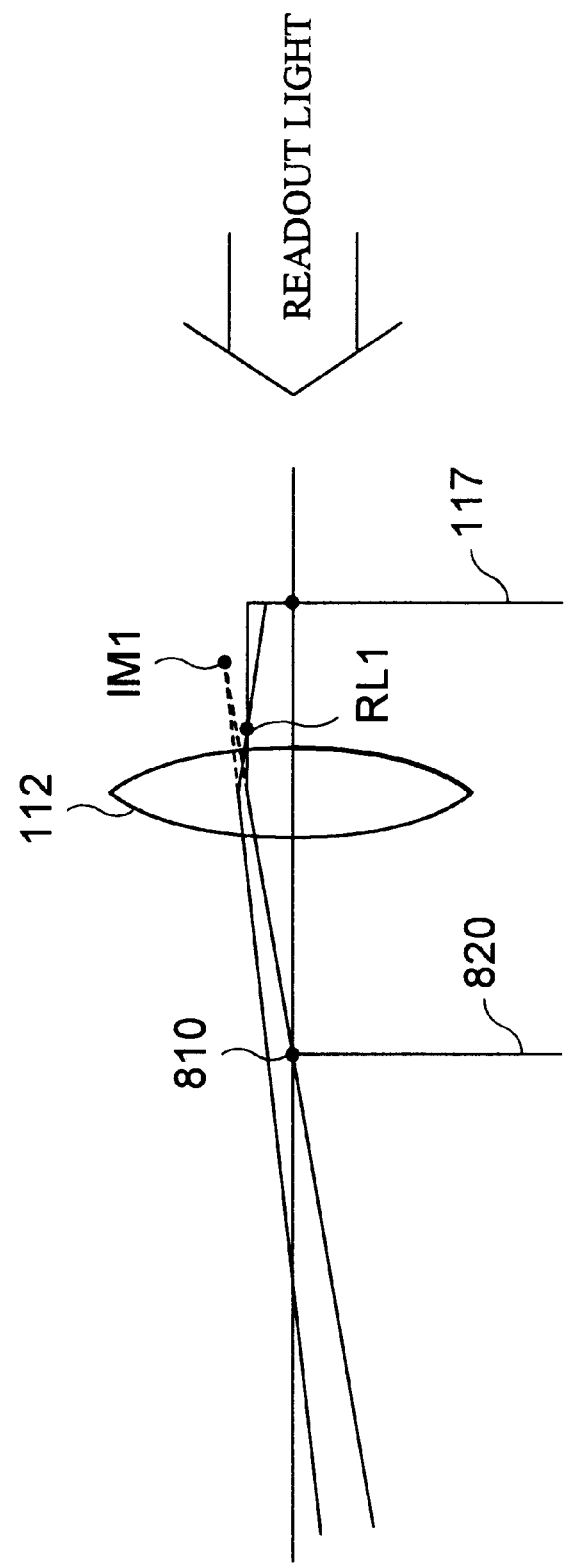
FIG. 9 is an explanatory view showing how a reproduced image in the hologram displaying apparatus in accordance with the above-mentioned embodiment is viewed.

FIG. 9 is an explanatory view showing how a virtual image is observed at the time of image reproduction. When the hologram 117 is irradiated with parallel light which is a conjugate wave of the reference light used for producing it, i.e., readout light, light with a wavefront forming a real image RL1 is generated. This light is fed into the imaging optical system 112, thereby becoming light with a wavefront forming a virtual image IM1. As shown in FIG. 9, the light with a wavefront forming the virtual image IM1 passes through a portion above the focal point in the paper surface in the focal plane of the imaging optical system 112 opposite to the hologram 117. Accordingly, when this light is observed from behind the focal plane of the imaging optical system 112 opposite to the hologram 117 so as to view the virtual image IM1, the whole image in the correct image direction can favorably be viewed without distortion.

Figure 10:
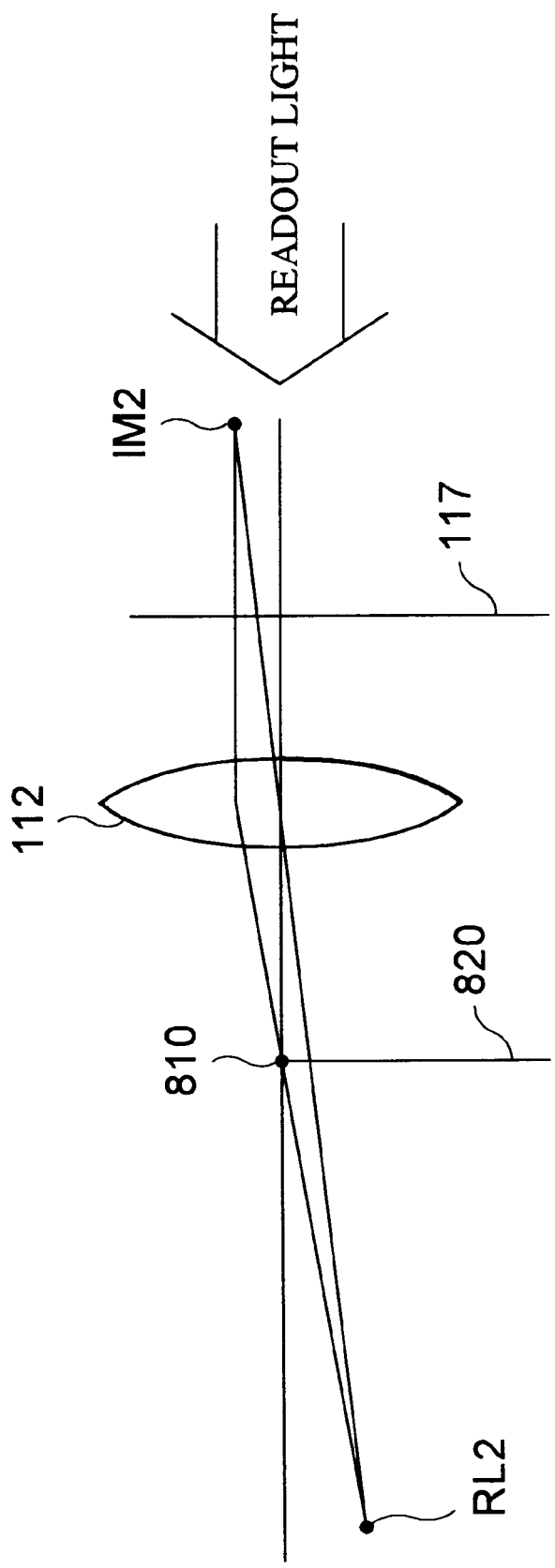
FIG. 10 is an explanatory view showing how a conjugate image in the hologram displaying apparatus in accordance with the above-mentioned embodiment is eliminated.

FIG. 10 is an explanatory view showing how the conjugate image is eliminated at the time of image reproduction. As shown in FIG. 10, when the hologram 117 is irradiated with parallel light which is a conjugate wave of the reference light used for producing it, i.e., readout light, light with a wavefront forming a virtual image IM2, which is a conjugate image of the real image RL1, is generated. This light is fed into the imaging optical system 112, thereby becoming light with a wavefront forming a real image RL2. As shown in FIG. 10, the light with a wavefront forming the real image RL2 passes through a portion below the focal point in the paper surface in the focal plane of the imaging optical system 112 opposite to the hologram 117, so as to be blocked by the zero-order light-shielding plate 810 or the light-shielding plate 820. As a result, when the virtual image IM1 is viewed from behind the focal plane of the imaging optical system 112 opposite to the hologram 117 as explained with reference to FIG. 9, the light with a wavefront forming the real image RL2 is prevented from mixing with the light to be viewed, whereby the image can be viewed favorably.

As explained in detail in the foregoing, in the hologram producing apparatus of the present invention, since the hologram is produced by calculation while the propagation function is restricted so as to have a value only in a half space, the conjugate image is easily eliminated at the time of image reproduction, whereby a high-grade hologram can be recorded.

Also, in the hologram producing apparatus of the present invention, since the hologram is produced by calculation while the inverted Fourier transform of propagation function is restricted so as to have a value only in a half space, the conjugate image is easily eliminated at the time of image reproduction, whereby a high-grade hologram can be recorded.

Further, in the hologram displaying apparatus of the present invention, since an imaging optical system equivalent to that used for producing a hologram is adopted while the light with a wavelength forming a real image formed by the imaging optical system is blocked, the light concerning the conjugate image is eliminated from the hologram recorded by the hologram producing apparatus of the present invention, so that the distortion with respect to the original image is reduced, whereby a high-grade image can be reproduced and displayed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 068738/1996 filed on Mar. 25, 1996 is hereby incorporated by reference.

What is claimed is:

1. A hologram calculating apparatus, for calculating desired hologram data displayed on a hologram surface of an in-line type hologram display apparatus to project a hologram image, comprising:

a wavefront determining section for determining a wavefront O of object light at a position of said hologram image in response to a given optical virtual image to be only observed, said hologram image being magnified with an imaging optical system of said hologram display; and a data calculating section for calculating said desired hologram data by computing a wavefront u of the object light at said hologram surface including performing a convolution integration of a propagation function f and an initial wavefront O of the object light at said hologram image.

2. A hologram calculating apparatus according to claim 1, wherein said wavefront determining section comprises:

a position computing section for computing a position of said hologram image based on characteristics of said imaging optical system; and a wavefront computing section for computing said wavefront O of the object light at said hologram image.

3. A hologram calculating apparatus according to claim 1, wherein said wavefront determining section comprises:

a position computing section for computing positions on said hologram surface, each position of said positions on said hologram surface corresponding to a selected point on said optical virtual image based on characteristics of said imaging optical system; and a wavefront computing section for computing wavefronts of the object light at each point of said hologram image.

4. A hologram calculating apparatus according to claim 1, further comprising a region defining section for defining said propagation function f of the wavefront at said hologram surface within a predetermined half plane in response to a mask of said imaging optical system which only passes light forming said optical virtual image.

5. A hologram calculating apparatus according to claim 4, wherein said data calculating section calculates said desired hologram data by calculating only a real component of said wavefront u of the object light at said hologram surface.

6. A hologram calculating method, for calculating desired hologram data projected on a hologram surface of an in-line type hologram display to project a hologram image, comprising:

determining a wavefront O of object light at a position of said hologram image in response to a given optical virtual image to be observed, said hologram image being magnified with an imaging optical system of said hologram display; and calculating said desired hologram data by computing a wavefront u of object light at said hologram surface including performing a convolution integration of a propagation function f and an initial wavefront O of the object light at said hologram image.

7. A hologram calculating method according to claim 6, wherein said determining a wavefront comprises:

computing a position of said hologram image based on characteristics of said imaging optical system; and computing said wavefront O of the object light at said hologram image.

8. A hologram producing method according to claim 6, wherein said determining a wavefront comprises:

computing positions on said hologram surface, each position of said positions on said hologram surface corresponding to a selected point on said optical virtual image based on characteristics of said imaging optical system; and computing wavefronts of the object light at each point of said hologram image.

9. A hologram calculating method according to claim 6, further comprising defining said propagation function f of the wavefront at said hologram surface within a predetermined half plane in response to a mask of said imaging optical system which only passes light forming said optical virtual image.

10. A hologram calculating method according to claim 9, wherein said calculating said desired hologram data is calculating only a real component of said wavefront u of the object light at said hologram surface.

11. An in-line type hologram display apparatus for displaying a hologram image with given hologram data, comprising:

a hologram surface for displaying said given hologram data to project a hologram image; and an imaging optical system for magnifying said hologram image to produce an optical virtual image.

12. A hologram display apparatus according to claim 11, wherein said hologram surface is a part of a spatial light modulator.

13. A hologram display apparatus according to claim 12, further comprising:

a light source to generate a readout light for said spatial light modulator.

14. A hologram display apparatus according to claim 11, further comprising:

a mask disposed at a focal point position of said imaging optical system opposite to said hologram image so as to only pass light forming said optical virtual image.

15. A hologram display method for displaying a hologram with given hologram data, comprising:

projecting a hologram image by displaying said given hologram data on a hologram surface; and producing an optical virtual image by magnifying said hologram image with an imaging optical system.

16. A hologram display method according to claim 15, further comprising:

passing only light forming said optical virtual image through a focal point position of said imaging optical system opposite to said hologram image.

17. An in-line type hologram producing apparatus, comprising:

a hologram surface for displaying hologram data to project a hologram image;

an imaging optical system for magnifying said hologram image to produce an optical virtual image;

a wavefront determining section for determining a wavefront O of object light at a position of said hologram image in response to said optical virtual image; and a data calculating section for calculating said hologram data by computing a wavefront u of object light at said hologram surface including performing a convolution integration of a propagation function f and an initial wavefront O of the object light at said hologram image.

18. An in-line type hologram producing apparatus according to claim 17, wherein said wavefront determining section comprises:

a position computing section for computing a position of said hologram image based on characteristics of said imaging optical system; and a wavefront computing section for computing said wavefront O of the object light at said hologram image.

19. An in-line type hologram producing apparatus according to claim 17, wherein said wavefront determining section comprises:

a position computing section for computing positions on said hologram surface, each position of said positions on said hologram surface corresponding to a selected point on said optical virtual image based on characteristics of said imaging optical system; and a wavefront computing section for computing wavefronts of the object light at each point of said hologram image.

20. An in-line type hologram producing apparatus according to claim 17, further comprising:

a mask disposed at a focal point position of said imaging optical system opposite to said hologram image so as to only pass light forming said optical virtual image.

* * * * *